United States Patent [19]
Radden

[11] Patent Number: 4,773,181
[45] Date of Patent: Sep. 27, 1988

[54] FLY-TYPE FISHING LURE

[76] Inventor: Charles J. Radden, Rte. 1, P.O. Box 1517, Baldwin, Mich. 49304

[21] Appl. No.: 2,789

[22] Filed: Jan. 13, 1987

[51] Int. Cl.$^4$ ............................................. A01K 85/08
[52] U.S. Cl. ................................... 43/42.37; 43/42.25
[58] Field of Search ................. 43/42.25, 42.26, 42.37, 43/42.38

[56] References Cited

U.S. PATENT DOCUMENTS

| | | | |
|---|---|---|---|
| 825,232 | 7/1906 | Mitchell | 43/42.38 |
| 975,833 | 11/1910 | Cox . | |
| 1,302,102 | 4/1919 | Tuttle . | |
| 1,973,139 | 9/1934 | Brush | 43/42.25 |
| 2,018,622 | 10/1935 | Davenport | 43/42.25 X |
| 2,043,609 | 6/1936 | Derry, Sr. | 43/48 |
| 2,612,717 | 10/1952 | Kuehnel | 43/42.25 |
| 2,909,862 | 10/1959 | Minnite | 43/42.25 |
| 3,323,248 | 6/1967 | Sutryn | 43/42.25 X |
| 3,568,354 | 3/1971 | Yacko | 43/17.6 |
| 3,605,317 | 9/1971 | Pobst | 43/42.25 |
| 3,690,028 | 9/1972 | Walker, Jr. | 43/17.6 |

Primary Examiner—Kurt Rowan
Assistant Examiner—Carmine Cuda
Attorney, Agent, or Firm—Price, Heneveld, Cooper, DeWitt & Litton

[57] ABSTRACT

A fishing lure is disclosed which includes at least one simulated fish egg secured with its center spaced from the shank of a hook to provide the appearance of a natural fish egg floating on or suspended in water. Each simulated egg is formed from a plurality of yarn strands tied together such that they expand into a spherical shape and may include different colored yarn defining a simulated egg nucleus or simulating sperm impregnation of the egg. Preferably the yarn eggs are tied with a transparent, nylon monofilament line which is sufficiently long to secure the egg in position spaced from the hook. Multiple simulated eggs forming an egg grouping may be included along with hair-like streamers also fastened to the hook.

11 Claims, 4 Drawing Sheets

FLY-TYPE FISHING LURE

BACKGROUND OF THE INVENTION

This invention relates to fishing lures and artificial bait and, more particularly, to an artificial fishing lure of the fly type including simulated fish eggs connected to a hook to provide the appearance of a natural fish egg or egg grouping when in use.

Trout, salmon and other fish in that family group are highly accustomed to eating natural fish eggs which are present in their natural habitat such as streams and lakes. Trout, salmon and other fish are highly attracted to such eggs which provide a high protein food source both when they are young and when they return to their home streams to spawn after reaching maturity. Depending on the number and type of fish species which cohabitate in a lake or stream, such eggs become more plentiful and are the preferred food for as many as eight or more months every year in many lakes and streams where spawning occurs. Indeed unlike minnows and insects which vary from stream to stream, fish eggs are available in nearly any stream which has spawning fish present at a particular time of the year. Consequently, fishermen have often used natural fish eggs as bait when sport fishing.

Typically, natural eggs are attached to hooks via nets or sacks and provide excellent bait. However, attaching natural eggs to a hook and retaining them on the hook in position to attract fish is quite difficult. Moreover, natural eggs are difficult to keep for any length of time without spoiling and, of necessity, must be replenished frequently. Although natural eggs may sometimes be cured to help preserve them, the process often times leaves an unnatural odor or changes the natural odor of the eggs making them less attractive to fish. Further, they can be difficult to transport without spoilage. Even when used, the necessity of attaching with sacks or nets has prevented the eggs from appearing naturally and thus has reduced the effectiveness of this type bait when fishing.

As an alternative to using natural eggs in sport fishing, fishermen have also used trout fly, bug or minnow-type lures. Indeed, such lures have remained unchanged for many years with the same basic patterns being made for long periods of time. However, fish are not as highly attracted to such fly-type lures as they are to fish eggs during spawning times of the year.

Although it has always been desired to take advantage of the natural attractiveness to fish of natural fish eggs, the use of artificial fish eggs has remained small because of the continuing need for a truly natural looking artificial or simulated fish egg lure. Previous artificial eggs have failed to recreate the natural size, dimensions and appearance of a natural egg.

Further, many streams have sections prohibiting the use of live or natural baits such as natural fish eggs. Also, many artificial lures made of materials such as metal, wood, rubber or plastic have also been banned in such stream sections. In such "quality" or "flies only" areas, only fly-type lures using materials such as fur, hair or feathers or other similar synthetic materials are allowed.

The need has thus been apparent for an artificial or simulated fish egg lure which avoids the inherent problems of using natural fish eggs, is as realistic as possible from all viewing angles of the fish, and is approved for use in "flies only" trout streams. It was also desired to provide simulated eggs which can be used in groups to heighten the attractiveness to fish. Further, a need has been apparent for an artificial fish egg lure which remains highly visible even in dirty water. The present invention was conceived in recognition of and as a solution for these and other needs.

SUMMARY OF THE INVENTION

Accordingly, the present invention provides a fishing lure, which I refer to as a "Radden's Flies Only Spawn" lure, including at least one simulated fish egg connected to a fish hook to provide the appearance of a natural fish egg floating on or suspended in water thereby taking advantage of the attractiveness to fish of natural fish eggs.

In one form, the invention is a fishing lure comprising a fish hook having a shank, a curved hook portion and means for securing the hook to a fish line. A simulated fish egg is included having a plurality of yarn strands secured together such that they expand into a generally spherical shape. A first line is provided for securing the simulated fish egg to the hook shank, one end of the first line being knotted about the yarn strands generally at their centers while another portion is fastened to the hook shank. A second line is tied about the hook shank with the first line being secured thereby to hold the second line and the simulated fish egg on the hook. In this fashion, the center of the simulated fish egg is spaced from the hook by the length of the first line such that the appearance of a natural fish egg floating on or suspended in the water is provided when the lure is in use.

In preferred forms of the invention, a total of two to six or more simulated eggs may be used each secured to the shank of the hook by a line tied to the shank by the wrappings of another line. In other aspects of the invention, a plurality of hair-like streamers may be secured by the wrappings of the securing line such that they extend either rearwardly from the hook or away from the hook between the simulated fish eggs.

The simulated fish eggs themselves may be formed from fine yarn of two colors with a minority of strands of a different color gathered in one group. When tied together, the expanded spherical shape provides a simulated fish egg of one color with a spot of a second color visible on the surface of the simulated egg to simulate the nucleus of an egg. Also, white yarn may be incorporated to provide the appearance of a fertilized egg. Multiple yarn colors may also be used in each egg if desired. Various yarn colors may be used including red, orange, chartreuse and others such as various fluorescent shades to provide high visibility even in murky or dirty water. In addition, wax may be used to secure and protect the line wrappings.

In other aspects of the invention, the simulated fish egg formed from yarn strands may be fastened by securing means to the fish hook, the securing means having one portion fastened to the fish hook, another portion fastened to the simulated fish egg and a predetermined length such that the simulated fish egg is positioned generally with its center spaced from the fish hook.

The fishing lure of the present invention provides numerous advantages over prior known lures. It may be used either wet or dry. When dry, it floats on the surface of the water being fished and supports the hook thereunder. Alternately, it may be attached to a weighted line and submerged in use such that the simulated egg appears suspended within the water.

The simulated fish egg approximates natural egg size and may be used in multiple egg groupings or in a single egg form. The yarn used to form the eggs can be of highly visible or fluorescent colors and combined with yarn of a different color to form a simulated egg nucleus as a spot or dot on the egg surface to add realism. In addition, white yarn may be added to simulate a fertilized egg. In each case, the hook is suspended under and spaced from the egg center to further create realism and the illusion of a floating egg or egg group.

Attachment of the fish eggs is preferably made with a transparent, nylon monofilament line to further the illusion of separation of the hook from the eggs and also to aid in floating the lure because of the natural buoyancy of such line. The lure hides approximately 80% of the hook in many embodiments to aid in catching trout, salmon or other fish while the eggs may be varied in size depending on the size of the hook used or the size of the natural egg to be imitated.

Further, the lure can be used with either fly or spinning-type rods since it is not live bait. The lures are made of selected yarn, thread and other materials and are tied together such that they fully qualify for use in "quality" or "flies only" streams. Also, the tying thread is positioned to close the normal gap in the hook eye to prevent the fishing line which is secured thereto from breaking or coming off. Moreover, the simulated eggs are secured such that they cannot move and close the gap between the hook point and shank which might occur in prior known lures and hinder the catching of fish.

These and other objects, advantages, purposes and features of the invention will become more apparent from a study of the following description taken in conjunction with the drawings.

DESCRIPTION OF THE PREFERRED EMBODIMENTS

Figure 1:
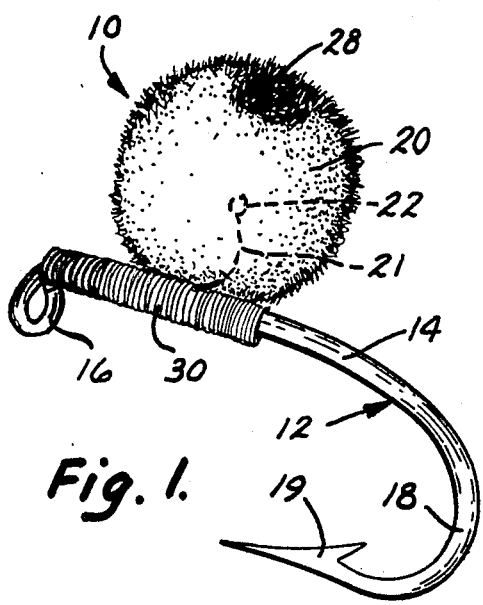
FIG. 1 is a perspective view of a first embodiment of the fishing lure including a single simulated fish egg.

Referring now to the drawings in greater detail, FIGS. 1–9 illustrate a first embodiment 10 of the fishing lure of the present invention including a single simulated unfertilized fish egg 20 or fertilized egg 20' secured by a single attachment line 22 to the shank 14 of any fish hook such as conventional fish hook 12. Fish hook 12 is of the type formed from metal including an eye 16 bent at one end for securing a fishing line leading from a rod such as a fly rod or spinning rod and a curved hook portion 18 at the opposite end including a barb 19. A gap 17 extends between the end of bent eye 16 and the beginning of shank 14. As described hereinafter, the simulated fish eggs 20 or 20' are secured along the shank portion 14 in various positions depending on the number of eggs to be included along with hair-like streamers if desired. Fish egg 20 or 20' is secured to the shank 14 such that its center 22 is spaced from the shank with hook 12 suspended therebelow. Positioning of the simulated fish eggs in this manner provides the appearance of a natural fish egg floating or suspended when the lure is placed in or submerged under the water.

Figure 2:
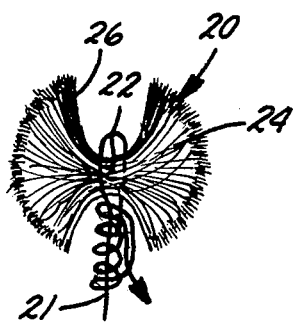
FIG. 2 is a fragmentary side elevation of the yarn strands during the tying procedure to form the spherical simulated unfertilized fish egg.
Figure 3:
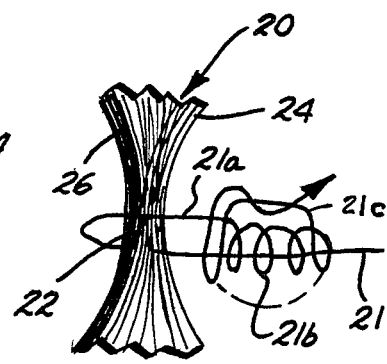
FIG. 3 is an enlarged fragmentary view of the knot securing the yarn strands to form the simulated unfertilized fish egg.

As shown in FIGS. 2 and 3, each unfertilized simulated fish egg 20 is formed from a bundle or plurality 24 of yarn strands which, initially, are aligned parallel to and closely adjacent one another. The yarn strands are of substantially equivalent length and may be dyed any desired color before forming the egg. It has been found that the attractiveness of the lure for fish is enhanced by using yarn strands of bright, mostly fluorescent colors such as red, orange, chartreuse or the like. In order to form a dot or spot visible on the surface of the formed simulated fish egg 20, a second bundle or grouping 26 of yarn strands is placed on one side of the bundle 24 as shown in FIG. 2. The yarn strands of bundle 26 comprise a minority of the entire egg and are dyed a different color from strands 24, either a darker or lighter color for contrast as compared to the color of strands 24. Again, strands 26 are placed parallel and closely adjacent one another and are of equivalent length. A preferred yarn having very fine strands suitable for use in making simulated egg 20 is that sold under the trademark "GLO-BUG" and available from The Bug Shop of Anderson, Calif. and is available in some forty colors.

In order to form the combined bundles 24, 26 of yarn strands into the shape of the simulated egg 20, a thin flexible attaching line 21 is looped about the center 22 of the combined bundles as best seen in FIG. 3. Preferably, attaching line 21 is an extra strong, transparent, premium monofilament line of approximately 0.007 to 0.013 inches diameter sold under the trademark TRI-LINE XL by Berkley and Co. of Spirit Lake, Iowa. The transparent line is less visible to fish than darker, opaque thread or line and thus adds realism to the lure. The line is also naturally buoyant and helps support the lure in water. Although nylon monofilament line is presently preferred, lines of other materials such as thin metal wire or a thin rubber strand could also be used. The end 21a of the line is doubled back along itself around the yarn bundles and looped successive times at 21b around the parallel lengths of the line on one side of the bundles. The end of the line is then drawn back through the initial loop and passed through loop section 21c which has been folded up from the position shown in phantom as shown in FIG. 3. The entire knot is then pulled tight to tightly clamp the yarn together generally at center 22. This causes the combined bundles to expand on either side of the center such that the yarn strands extend radially outwardly from center 22 in all directions. The strands may then be positioned and trimmed with scissors or other cutting tool to form the simulated egg into a generally spherical shape as shown in FIG. 1. Such shape includes a contrasting dot or spot 28 which simulates a natural egg nucleus providing greater realism for the egg and greater attractiveness to the fish when the lure is in the water. Dot or spot 28 is generally centered on each egg and faces away from line 21 and the securing knot.

Figure 25A:
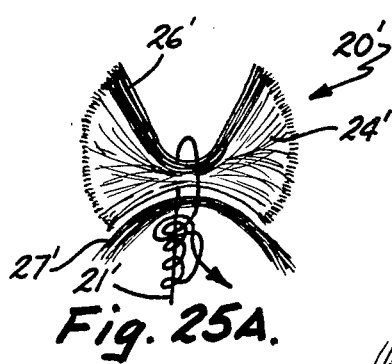
FIGS. 25A and 25B are side elevations of simulated fertilized fish eggs during and after formation.
Figure 25B:
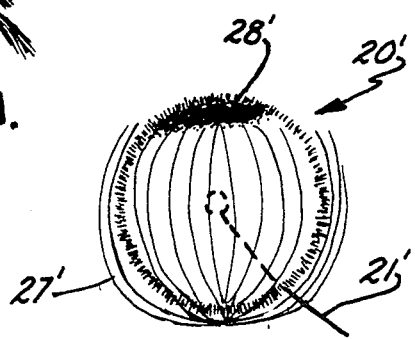

Alternately, a simulated fertilized egg 20' may be used as shown in FIGS. 25A and 25B. Egg 20' incorporates thin strips of white yarn similar to that used to form egg 20 such that, when shaped, the white yarn appears to encase or coat the egg when the simulated egg is in water just as in a redd (fish nest) where fish eggs are fertilized.

As shown in FIG. 25A, bundles of yarn strands 24' and 26' are aligned parallel to and closely adjacent one another as in egg 20. A bundle of white yarn strands 27' is positioned under bundle 24'. Line 21' is looped and knotted generally about the centers of bundles 24', 26' and 27' just as in egg 20. The strands of bundles 24', 26' are then positioned and trimmed into a generally spherical shape with a simulated nucleus 28' while bundle 27' is held out of the way below the egg. Thereafter, yarn 27' is positioned up and around formed bundles 24', 26' to provide a thin, exterior, white yarn layer which appears to encase or coat the egg 20' as shown in FIG. 25B.

Figure 4:
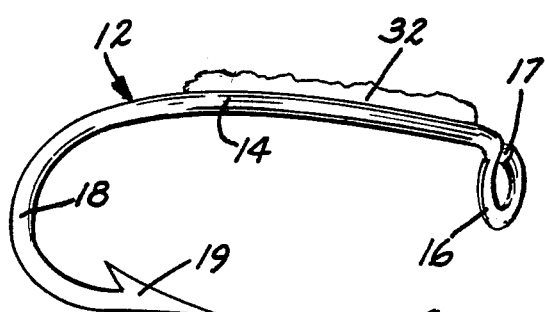
FIG. 4 is a perspective view of the initial step in making the fishing lure of the present invention showing a typical fish hook with a quantity of wax on the shank portion thereof.
Figure 5:
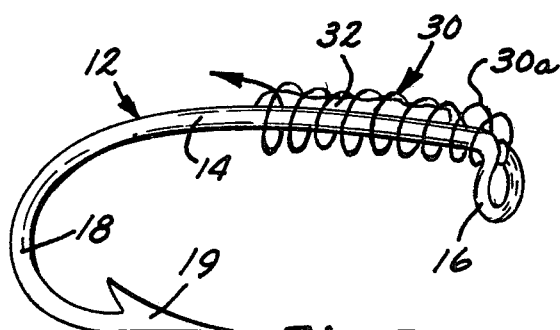
FIG. 5 is a perspective view of the initial wrapping of the egg securing line on the hook of FIG. 4.
Figure 6:
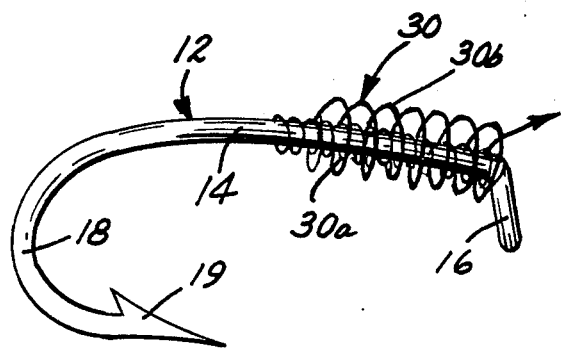
FIG. 6 is a side elevation of the second set of wrappings for the securing line on the hook of FIGS. 4 and 5.
Figure 7:
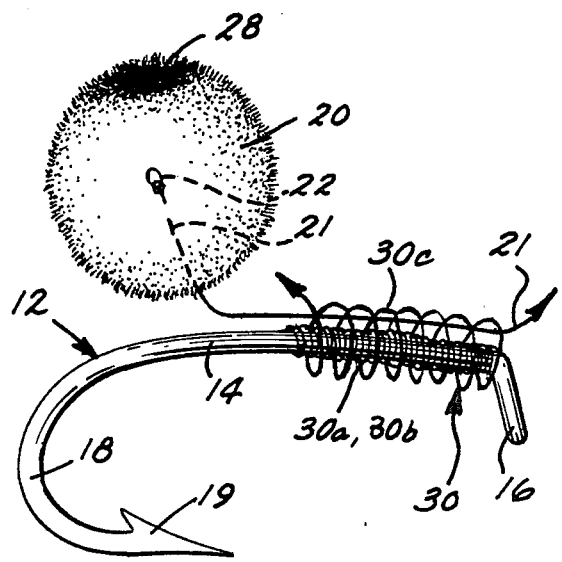
FIG. 7 is a side elevation of the third set of wrappings and the positioning of a single simulated fish egg and securing line extending under such wrappings on the hook of FIGS. 4–6.

As will now be understood from FIGS. 1 and 4–9, the simulated fertilized or unfertilized fish egg 20 and attaching line 21 or 21' are secured to the shank 14 of fish hook 12 preferably by a second, continuous line 30 wrapped around shank 14 from a position closing gap 17 of hook 12 rearwardly along the shank as described hereinafter. Closing gap 17 with thread wrappings prevents a fish line tied to eye 16 from being forced into the gap and breaking when fighting and catching a fish. It is especially important when using lighter, smaller diameter line such as that required to catch steelhead in clear water. Line 30 is preferably a conventional fly tying thread. As shown in FIG. 4, a quantity of formable wax 32 is placed along the top of hook shank 14 from a position immediately behind the eye 16 to the bend in the hook along the shank 14. A suitable wax has been found to be Overton's Wonderwax available from Overton's Wonder Wax Company of Libby, Mont. Attaching line 30 is looped around the shank 14 and wax 32 as shown in FIG. 5 beginning at a position 30a at eye 16 so as to close gap 17 and wrapping rearwardly in a first layer for eight to ten loops. As shown in FIG. 6, a second layer of wrapping 30b using the same continuous line 30 is wrapped over initial wrapping 30a in a forward direction back toward gap 17 of eye 16 also for some eight to ten loops as shown in FIG. 6. Next, transparent monofilament securing line 21 which has previously been tied to the center of yarn strands 24, 26 to form the simulated egg, is drawn through the third series of loops 30c in continuous line 30 extending rearwardly over the first two wrapping layers 30a, 30b as shown in FIG. 7. Line 21 is drawn under loops 30c such that simulated egg 20 is approximately positioned over the curved hook end 18 of the hook as illustrated. Wrappings 30c are then wrapped tightly about the shank and previous wrappings 30a, 30b to hold the length of line 21 thereunder.

Figure 8:
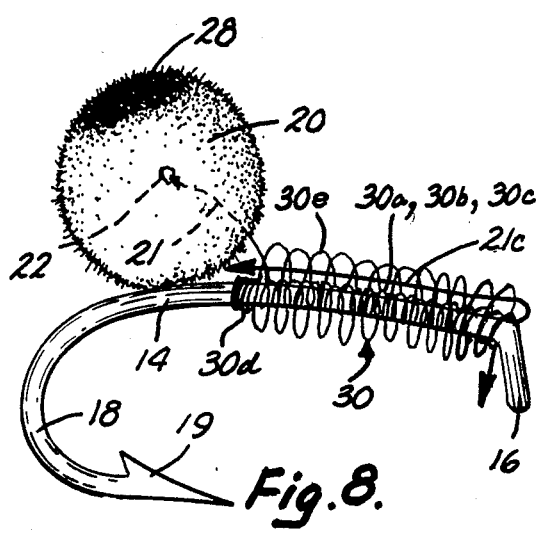
FIG. 8 is a side elevation of a fourth set of wrappings and engagement of the securing line for the simulated fish egg with those wrappings.

Next, as shown in FIG. 8, two or three wrappings 30d of continuous attaching line 30 are wrapped behind line 21 generally under the position of simulated egg 20. Thereafter, line 21 is pulled to bring simulated egg 20 closer to wrapping line 30 to its final position and the extending length 21c of line 21 is doubled back over existing thread wrappings and passed under another series of eight to ten loops 30e of continuous line 30. Loops 30e are wrapped forwardly over previous wrappings 30a, 30b and 30c as shown in FIG. 8. Wrappings 30e are then pulled tight over line 21 and line portion 21c to securely hold the line and egg 20 on the hook shank.

Figure 9:
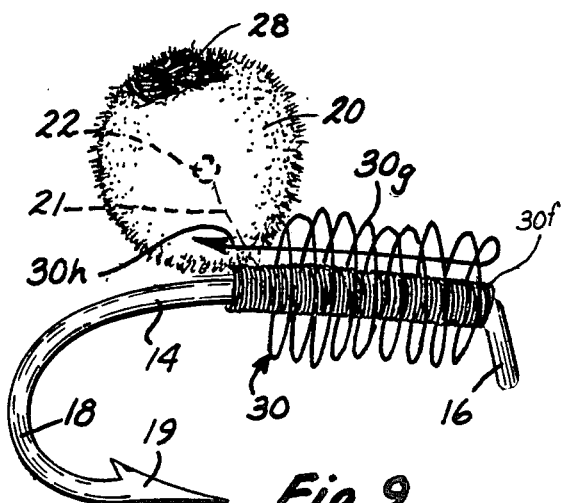
FIG. 9 is a side elevation of the final securing step for the simulated fish egg on the hook of FIGS. 4–8 illustrating a whip finish knot for completing the attachment.
Figure 10:
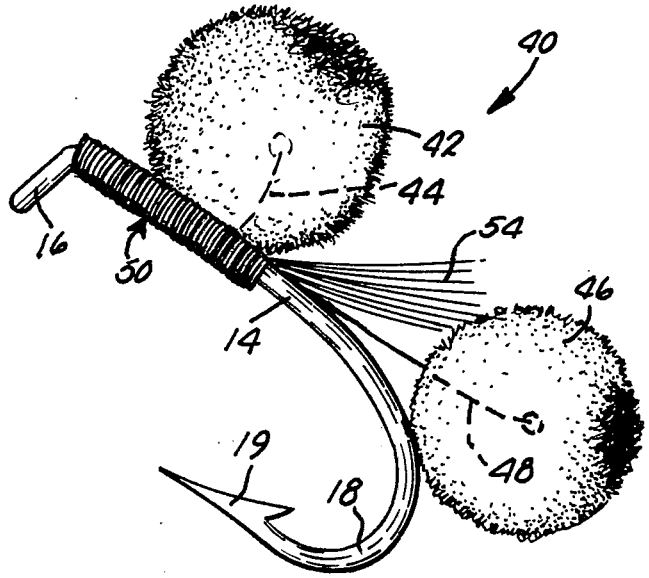
FIG. 10 is a side elevation of a second embodiment of the fishing lure of the present invention including a pair of simulated fish eggs and hair-like streamers extending therebetween.

As shown in FIG. 9, the attachment of egg 20 to hook 12 is completed by wrapping continuous line 30 rearwardly with eight to ten loops 30f pulled tightly down around and over prior wrappings 30a–30e followed by a final forward wrapping 30g of line 30. After end 30h of line 30 is passed rearwardly through and under loops 30g, loops 30g are pulled tightly in a "whip finish" knot which holds the egg 20 securely on shank 14. The end of line 21 may then be trimmed close to line 30. It will be understood that the some 40 to 50 wraps of the fly tying thread or line 30 around shank 14 and over attaching line 21 from egg 20 cause wax 32 to cover the various thread wrappings and each wrapping layer. An additional light layer of wax may be placed over the completed thread wrappings 30 for additional protection against abrasion and degradation in use. In use, when lure 10 is submersed in cold water such as 50 degrees F. or below, wax 32 hardens creating a protective waterproofing for the thread 30 and helping to retain the thread on the hook and lengthening the life of the thread. The wax also acts as a lubricant for the egg securing line or lines when the eggs are pulled in and aligned on the hook at room temperature (70 degrees F.) during formation.

Referring now to FIGS. 10–14, a second embodiment 40 of the fishing lure is illustrated. Lure 40 includes a pair of simulated fish eggs 42, 46 fastened by separate transparent monofilament attaching lines 44, 48, respectively, to shank 14 of hook 12 by a single, continuous, wrapped securing line 50. In addition, a quantity of decorative, hair-like streamers or strands 54 is secured within the wrappings of continuous line 50 and extends rearwardly between the eggs 42, 46. Strands or streamers 54 act as attractors and flash to attract fish even in dirty or murky water. Preferably streamers 54 are formed from thin, shiny plastic film strips sold under the trade name "FLASHABOU" and available in three or four colors or from thin synthetic threads having iridescent dots therealong sold under the trade name "CRYSTAL HAIR" and available in ten or so colors.

Figure 11:
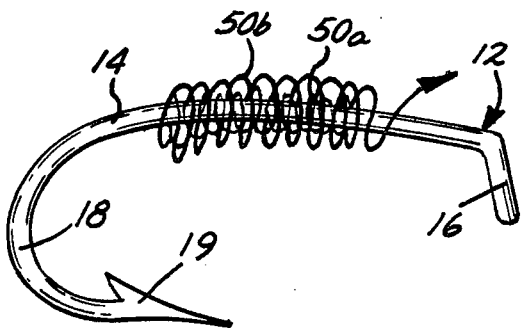
FIG. 11 is a side elevation of the initial securing line wrappings for attaching the second of the two simulated fish eggs to the hook and lure of FIG. 10.
Figure 12:
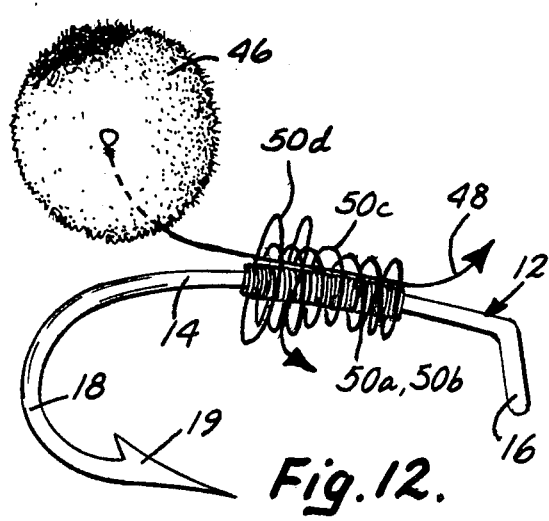
FIG. 12 is a side elevation of additional line wrappings and the initial attachment of the second simulated fish egg to the hook of FIGS. 10 and 11.
Figure 13:
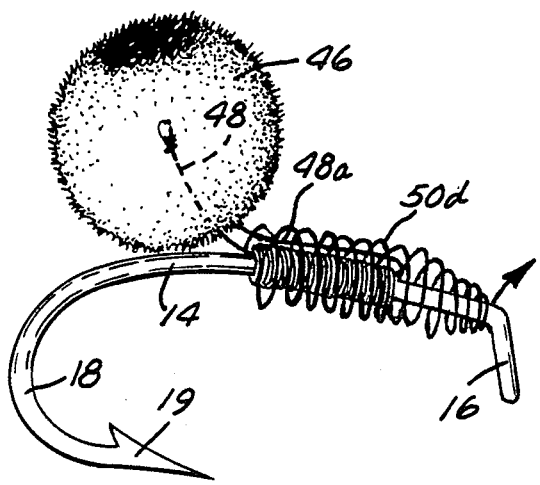
FIG. 13 is a side elevation of the completion of the attachment of the second simulated fish egg to the hook of FIGS. 10–12.

As shown in FIGS. 11–14, the construction of fishing lure 40 is similar to embodiment 10 but begins with the application of initial wrappings of line 50 on the rearward portion of hook shank 14 as shown in FIG. 11. In this case, at approximately the middle of shank 14, the initial wrappings 50a of line 50 are applied over a quantity of wax and wrapped rearwardly with ten to twelve wraps about the hook shank and then forwardly with approximately ten wraps 50b back toward eye 16 of hook 12. Wraps 50a, 50b are pulled tight and a third layer of wrappings 50c is applied rearwardly over wraps 50a, 50b as shown in FIG. 12. Attaching line 48 from simulated egg 46, which has been previously formed as described for simulated egg 20 above and tied to line 48, is then pulled through the loose wrappings 50c such that egg 46 is positioned approximately over the curved hook portion 18 of hook 12. After wrappings 50c are pulled tight, simulated egg 46 is then pulled closer to wrappings 50 to its final position (FIG. 13) and the end 48a of line 48 is then doubled back over existing layers of thread wrappings. Wrappings 50d are then wrapped tightly around the shank with each revolution of the thread to hold line end 48a securely. Wrappings 50d extend forwardly to eye 16 to close gap 17 and to hold line 48 and line end 48a securely in place. The doubling back of line 48 prevents egg 46 from sliding back toward barb 19 or being pulled rearwardly off the hook.

Figure 14:
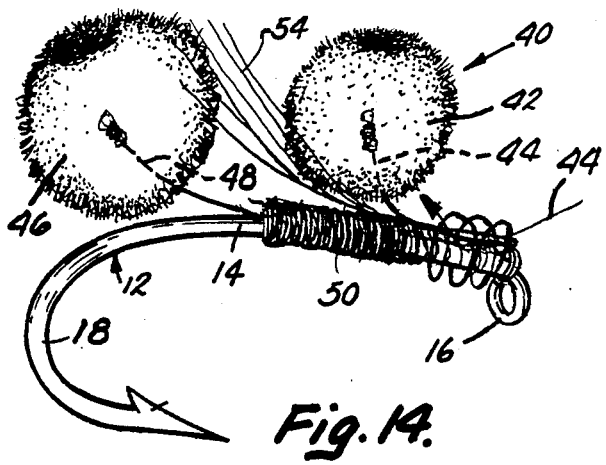
FIG. 14 is a perspective view showing the hook of FIGS. 10–13 and the attachment of the first simulated egg and a group of hair-like streamers ahead of the second egg.

As shown in FIG. 14, the first egg 42 is formed on and tied to line 44 in the same manner described above for egg 20 and applied to the front area of shank 14 of hook 12 by a continuation of the wrapping of line 50 forwardly and rearwardly in the same manner described above and shown in FIGS. 4–9 for embodiment 10 of the invention. Attaching line 44 is pulled through the wrappings of line 50 on the forward portion of shank 14 doubled back on itself and tightened within the wrappings as shown in FIGS. 4–9. If desired, a bundle or grouping of strands or hair-like streamers 54 may be placed under the wrappings of line 50 at the same time line 44 is pulled through the looped wrappings during the step of wrapping line 50 around line 44 as shown in FIG. 7. The wrappings may then be pulled tight simultaneously around hair-like streamers 54 and line 44 which has been doubled back upon itself to prevent the egg from being pulled off the hook rearwardly in the same manner as for line 21 in embodiment 10. A whip finish knot like that in FIG. 9 completes the tying of line 50. The completed lure 40 thus includes a pair of simulated eggs which are spaced from the shank 14 of hook 12 by the respective lengths of attaching lines 44, 46 and includes decorative streamers simulating debris in the fish eggs.

Figure 15:
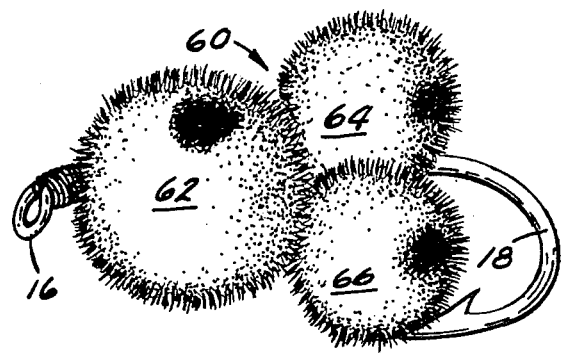
FIG. 15 is a perspective view of a third embodiment of the fishing lure of the present invention including three simulated fish eggs.
Figure 16:
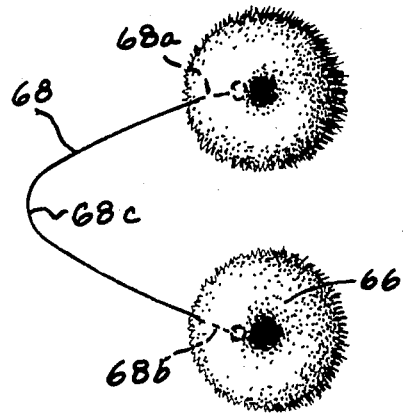
FIG. 16 is a plan view of a portion of the lure of FIG. 15 showing a pair of simulated fish eggs fastened to a single securing line prior to assembly.
Figure 17:
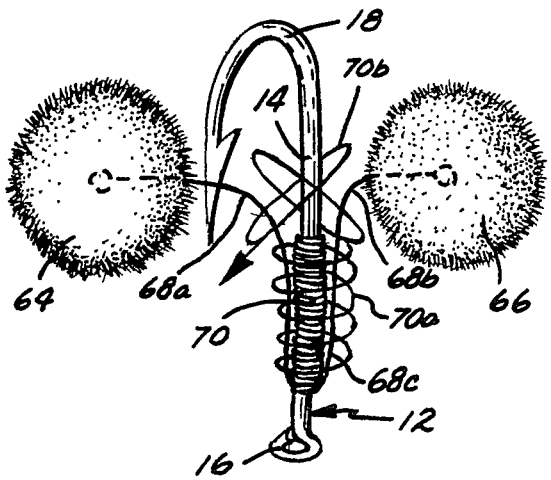
FIG. 17 is a plan view of the line wrappings and attachment of the securing line from the pair of simulated fish eggs in FIG. 16 to the hook to complete the third embodiment of the fishing lure.

Referring now to FIGS. 15–17, a third embodiment 60 of the fishing lure of the present invention is illustrated. Lure 60 includes three simulated fish eggs 62, 64, 66 with simulated egg 62 being slightly larger than eggs 64 and 66 which are generally equivalent in size. Eggs 62, 64 and 66 are formed from yarn strands and tied to transparent monofilament attaching lines in the same manner described above in connection with simulated egg 20 in FIGS. 1–3. However, as shown in FIG. 16, eggs 64 and 66 are tied as a pair to opposing ends 68a, 68b of a single attaching line 68.

As shown in FIG. 17, eggs 64, 66 on line 68 are first secured to shank 14 of hook 12 by the wrappings of a single, continuous securing line 70 which is applied in generally the same manner as line 50 as shown in FIGS. 11–14. Line 70 is applied over a quantity of wax in like manner in the middle of shank 14 with wrappings 70a looped over two previously applied wrapped layers of line 70 and encompassing the folded center portion 68c of attaching line 68 which is passed thereunder as shown in FIG. 17. Wrappings 70a are pulled tightly around shank 14 and over line portion 68c followed by the wrapping of line 70 in a figure eight pattern 70b around and behind line ends 68a, 68b such that those portions of the line with eggs 64, 66 attached will stand out and project outwardly away from the sides of hook shank 14 as shown in FIG. 17. Thereafter, attaching line portion 68c is pulled forwardly to move eggs 64, 66 in toward the hook shank 14 and doubled back over itself and under a final series of wrappings in line 70 just as with line end 48a in lure 40. Line 70 is then wrapped around the forward portion of shank 14 as described for lure 40 in FIGS. 13 and 14 to close gap 17 of the hook and attach the third simulated egg 62 on its own individual attaching line (not shown) followed by the inclusion of a whip finish knot like that in FIG. 9 to complete the wrappings of line 70. Accordingly, the completed lure 60 includes three simulated eggs positioned in a generally triangular arrangement as shown in FIG. 15 but each having its center spaced from hook shank 14.

Figure 18:
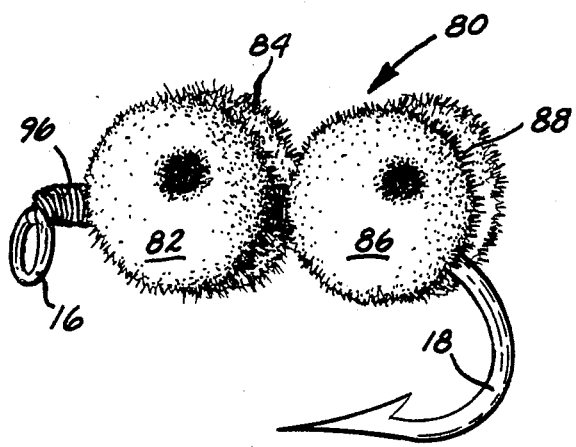
FIG. 18 is a perspective view of a fourth embodiment of the fishing lure of the present invention including four simulated fish eggs.
Figure 19:
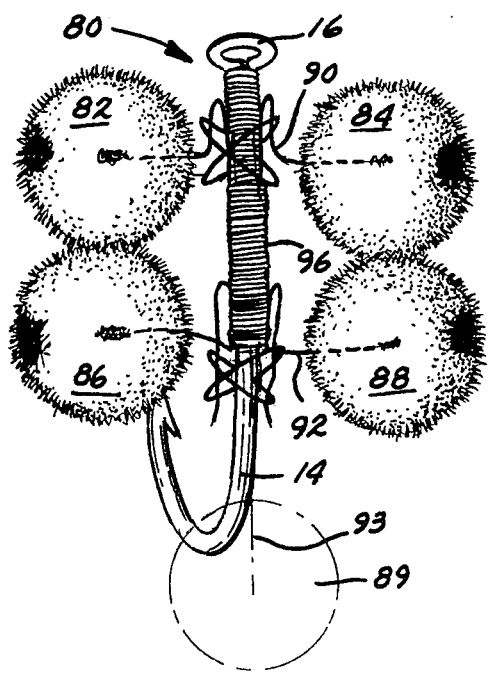
FIG. 19 is a plan view of the fishing lure embodiment of FIG. 18 during assembly.

Referring now to FIGS. 18 and 19, a fourth embodiment 80 of the fishing lure is shown including four simulated fish eggs 82, 84, 86 and 88 formed from yarn strands just as in egg 20 above. In this embodiment, eggs 82 and 84 are tied as a pair to opposite ends of transparent monofilament attaching line 90 while eggs 86, 88 are tied as a pair to transparent monofilament line 92 with an egg on each end of the line in the same manner that eggs 64 and 66 were secured to a single line 68 as shown in FIG. 16. Attaching lines 92, 90 are fastened to shank 14 of hook 12 as shown in FIG. 19 by an additional line 96 wrapped continuously around shank 14 as described above for embodiment 60. The wrappings of line 96 are begun in the middle of the shank for securing attaching line 92 with eggs 86, 88 and, thereafter, by wrapping forwardly toward eye 16 to close gap 17 to attach line 90 including eggs 82 and 84. As with embodiment 60, each of lines 90, 92 is wrapped tightly by continuous line 96, line 96 being wrapped around and behind those lines in a figure eight pattern to urge the ends of those lines outwardly away from the shank such that eggs 82, 84, 86 and 88 are arranged in a generally rectangular pattern as shown in FIG. 19. Although shown in a rectangular pattern, the eggs may be arranged in virtually any formation on the hook because there is no set formation in which the current of a stream would position a group of natural eggs. As with the other embodiments, attaching lines 90, 92 are pulled toward wrappings 96, doubled back on themselves, and secured under additional wrappings of line 96. Line 96 is finished with a whip finish knot like that of FIG. 9 and also includes a quantity of wax for protection and additional securement.

As shown in FIG. 19, a fifth simulated egg 89 may be added to embodiment 80 if desired. Egg 89, which is also formed from yarn like egg 20, is tied to shank 14 by transparent monofilament attaching line 93 such that the egg extends rearwardly over the curved hook portion like egg 46 of lure 40. Line 93 is secured within the wrappings of line 96 in like fashion to line 48 in lure 40.

Figure 20:
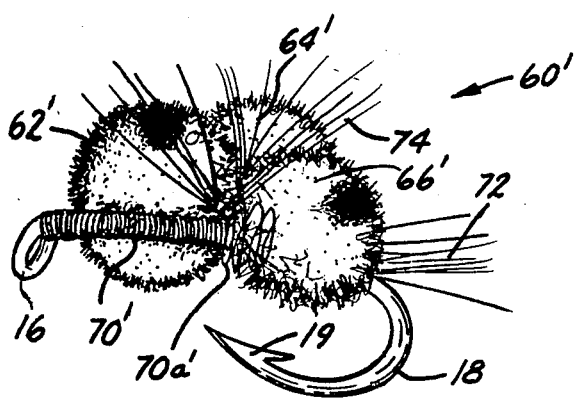
FIG. 20 is a perspective view of a fifth embodiment of the fishing lure of the present invention showing attachment of the hair-like streamers between the three simulated fish eggs.

FIGS. 20–24 illustrate additional, alternative embodiments of the fishing lure. As shown in FIG. 20, lure embodiment 60' is substantially similar to embodiment 60 including three simulated fish eggs but, in addition, having two groups of hair-like streamers 72, 74 providing attraction for fish even in dirty water. One group 72 of the hair-like streamers is applied under wrappings 70' and extends rearwardly of the hook beyond the curved hook portion 18 like streamers 54 of lure 40. A second group 74 of the hair-like streamers is applied generally in the middle of shank 14 and intermediate eggs 62', 64' and 66'. Streamers 74 are applied to the middle of shank 14 in the manner illustrated in FIG. 22 by passing the streamers 74 through the loose wrappings 70a of continuous attaching line 70' during the wrapping of line 70' around shank 14. When the group of streamers 74 is positioned with its center under the wrappings 70a', the wrappings may then be tightened to secure the streamers in place. They may be positioned upwardly between the various eggs as shown in FIG. 20.

Figure 21:
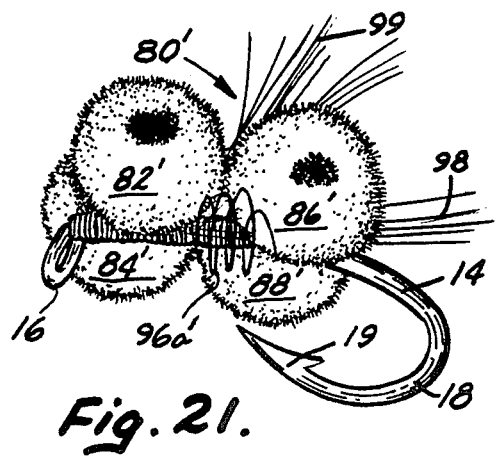
FIG. 21 is a perspective view of a sixth embodiment of the fishing lure of the present invention showing four simulated fish eggs and the attachment of hair-like streamers to the center of the hook shank.
Figure 22:
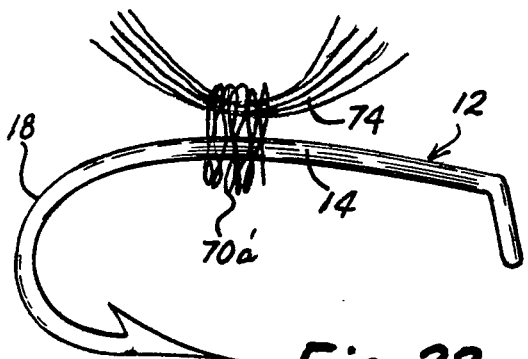
FIG. 22 is a side elevation schematically showing the attachment of the hair-like streamers to the center of the hook shank.

As shown in FIG. 21, embodiment 80' of the fishing lure is substantially similar to embodiment 80 except for the inclusion of two groups 98 and 99 of hair-like streamers secured within wrappings 96' and 96a' in like manner to embodiment 60'. In this case, streamers 98, which extend rearwardly of hook 12 over curved hook portion 18, are secured within the wrappings 96' while streamers 99 which extend upwardly through the eggs 82', 84', 86' and 88' are passed through the loose wrappings 96a' in the middle of the shank before tightening.

Figure 23:
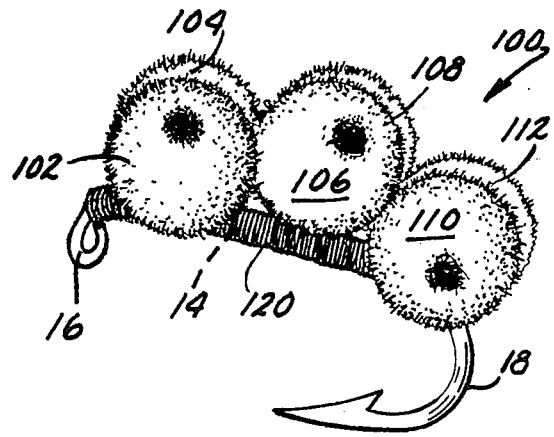
FIG. 23 is a perspective view of a seventh embodiment of the fishing lure of the present invention showing six simulated fish eggs.
Figure 24:
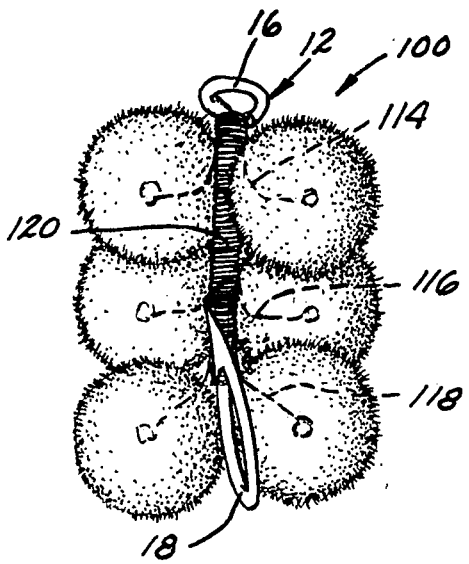
FIG. 24 is a bottom plan view of the fishing lure of FIG. 23.

As shown in FIGS. 23 and 24, yet another embodiment 100 of the fishing lure is shown including six simulated fish eggs 102, 104, 106, 108, 110 and 112. These eggs are applied in pairs in the same manner as shown in FIG. 16 to the hook 12 by three separate transparent monofilament attaching lines 114, 116, 118 respectively. Lines 114, 116, 118 are tied to shank 14 of hook 12 by a continuous attaching line 120 wrapped about the shank and securing the lines in the same manner as described in embodiments 60 and 80. Line 120 is wrapped beginning first at the rear of shank 14 with the rearwardmost line 118, next wrapping forwardly to apply the intermediate line 116, and finally wrapping further forward toward eye 16 to close gap 17 and complete the construction with application of the third or forwardmost line 114. Again, as in embodiments 60 and 80, figure eight wrappings around lines 114, 116 and 118 are made with line 120 to urge those lines to stand outwardly away from the sides of shank 14. Also lines 114, 116 and 118 are doubled back on themselves under additional wrappings of line 120 as in embodiments 60 and 80 to further secure the eggs. Line 120 is finished with a whip finish knot as in FIG. 9.

As will now be apparent, the fishing lure of the present invention may be formed with from one to six or more simulated fish eggs secured to the shank portion of a hook preferably by wrapping one line about the shank for engagement with an attaching line leading from the simulated eggs either alone or in pairs as described. Each of the simulated fish eggs has its center spaced from the hook shank such that in combination the eggs form a simulated natural egg grouping when multiple eggs are used or a simulated natural egg from which the hook is suspended when in the water when a single egg is used. In each case, the lure draws upon the natural attraction of the fish to fish eggs for feeding purposes to create an effective and durable fishing lure.

The simulated eggs may be formed from various colors of yarn as described in sizes ranging from approximately 4 to 12 mm. in diameter depending on the size of the hook to which they are to be attached and the size of the egg to be imitated. Different species of fish have different sizes and colors of eggs. For example, a 4 mm. egg would be tied by itself on a #16 or #14 hook, two 4 mm. eggs would be tied on a long shank #16 or #14 hook, four 4 mm. eggs or six 3 mm. eggs would be tied on a #6 hook, and six 4 mm. eggs would be tied on a #4 hook. Alternately, 5.5 to 6 mm. eggs could be fastened on a #10 hook singly or in pairs or four 8 to 12 mm. eggs could be placed on a #4 long shank hook. Generally, the smaller the hook, the smaller the egg size when multiple eggs are added. Also, the colors of yarn for the simulated eggs may be mixed in multiple egg versions of the lure.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A fishing lure comprising:
   a fish hook having a shank, a curved hook portion and means for securing said hook to a fish line;
   a simulated fish egg having a plurality of yarn strands secured together such that they expand into a generally spherical shape;
   a first line for securing said simulated fish egg to said hook shank;

said yarn strands being generally parallel to one another at their centers, one end of said first line being knotted about said yarn strands generally at their centers such that said strands are tied tightly together against one another at said centers, said yarn strands being expanded on either side of said tightly tied centers and extending radially outwardly from said centers into a generally spherical shape, said first line extending generally radially outwardly from said centers toward said hook shank, another portion of said first line being fastened to said hook shank; and a second line tied about said hook shank with said first line being secured thereby to hold said first line and simulated fish egg on said hook;

a second simulated fish egg similar to said first egg formed from yarn strands tied together like said first egg; the second end of said first line being knotted about said yarn strands of said second egg generally at their centers; said portion of said first line which is fastened to said hook shank being intermediate said eggs and tied to said hook shank at a first position by said second line wrappings;

third and fourth simulated fish eggs similar to said first and second eggs, each being formed from yarn strands tied together like said first and second eggs;

a third line for securing said third and fourth eggs to said hook shank; opposing ends of said third line being knotted about said yarn strands of said third and fourth eggs respectively generally at their centers, a portion of said third line intermediate said third and fourth eggs being tied to said hook shank at a second position spaced along said shank toward said curved hook portion of said fish hook from said first position by said second line wrappings;

whereby the center of each of said simulated fish eggs is spaced from said hook by a portion of the length of said first or third lines to provide the appearance of natural fish eggs floating on or suspended in water.

2. The lure of claim 1 including a plurality of hair-like streamers secured in said second line wrappings and extending away from said hook.

3. The lure of claim 1 including a fifth simulated fish egg similar to said other eggs and formed from yarn strands tied together like said other eggs; a fourth line for securing said fifth egg to said hook shank, one end of said fourth line being knotted about said yarn strands of said fifth egg generally at their centers and another portion of said fourth line being tied to said hook shank by said second line wrappings.

4. The lure of claim 1 including fifth and sixth simulated fish eggs similar to said other eggs, each being formed from yarn strands tied together like said other eggs; a fourth line for securing said fifth and sixth eggs to said hook shank; opposing ends of said fourth line being knotted about said yarn strands of said fifth and sixth eggs respectively generally at their centers, a portion of said fourth line intermediate said fifth and sixth eggs being tied to said hook shank at a third position spaced along said shank toward said curved hook portion of said fish hook from said second position by said second line wrappings.

5. The lure of claim 4 wherein each of said first, third and fourth lines is transparent.

6. A fishing lure comprising:

a fish hook having a shank, a curved hook portion and means for securing said hook to a fish line;

a simulated fish egg having a plurality of yarn strands secured together such that they expand into a generally spherical shape;

a first line for securing said simulated fish egg to said hook shank, one end of said first line being knotted about said yarn strands generally at their centers, another portion of said first line being fastened to said hook shank; and a second line tied about said hook shank with said first line being secured thereby to hold said first line and simulated fish egg on said hook;

whereby the center of said simulated fish egg is spaced from said hook by the length of said first line to provide the appearance of a natural fish egg floating on or suspended in water;

said plurality of yarn strands including a majority of strands of a first color and a minority of strands of a second color, said minority of strands being gathered in one group such that, when tied tightly together by said first line, said expanded spherical shape provides a simulated fish egg of said first color with a spot of said second color thereon visible on the surface of said egg, said spot simulating the nucleus of an egg; said simulated fish egg including a third group of yarn strands of a third color and tied to said first and second yarn groups by said first line; said third yarn group being formed around the exterior of said first and second yarn groups to provide a thin yarn layer over said exterior to simulate a fertilized fish egg.

7. The lure of claim 6 wherein said third group of yarn strands is white in color.

8. A fishing lure comprising:

a fish hook having a shank, a curved hook portion and means for securing said hook to a fish line;

a simulated fish egg formed from yarn strands fastened together and extending into a generally spherical shape;

securing means for attaching said simulated fish egg to said fish hook, said securing means having one portion fastened to said fish hook, another portion fastened to said simulated fish egg, and a predetermined length such that said simulated fish egg is positioned generally with its center spaced from said fish hook;

whereby said simulated fish egg on said fish hook provides the appearance of a natural fish egg floating on or suspended in water; said simulated fish egg including yarn of two colors, one color yarn being positioned in one area of the egg to form a spot on the egg surface which simulates the nucleus of an egg; said egg also including yarn of a third color formed around the exterior of said egg to provide a thin outer layer of yarn of said third color to simulate a fertilized fish egg.

9. A simulated fish egg for use in fishing lures comprising:

a plurality of yarn strands fastened together generally at their centers, said yarn strands including a majority of strands of a first color and a minority of strands of a second color, said minority of strands being gathered in one group such that when fastened together, said plurality of yarn strands form a generally spherical shape with a spot of said second color visible on the surface of said egg, said spot simulating the nucleus of a fish egg; and a third group of yarn strands of a third color and also fastened to said first and second yarn groups generally at their centers; said third yarn group being formed around the exterior of said first and second yarn groups to provide a thin yarn layer over said exterior to simulate a fertilized fish egg.

10. The lure of claim 9 wherein said third group of yarn strands is white in color.

11. A simulated fish egg for attachment to a fish hook to form a fishing lure, said egg assembly comprising a pair of simulated fish eggs each having a plurality of yarn strands secured together such that they expand into a generally spherical shape, and a flexible line for securing said simulated fish eggs to one another and to the fish hooks; said yarn strands in each egg being generally parallel to one another at their centers, one section of said line being secured to said yarn strands in one of said eggs generally at their centers such that said strands are secured tightly together against one another at their centers at said one section, a second section of said line which is spaced from said first section being secured to said yarn strands in the other of said eggs generally at their centers such that said strands are secured tightly together against one another at their centers at said second section, said yarn strands in each egg being expanded on either side of said tightly secured centers and extending radially outwardly from said centers into a generally spherical shape, said line extending generally radially outwardly from said centers and having a portion intermediate said first and second sections and simulated eggs which is attachable to the fish hook whereby said eggs may be secured to the hook with their centers spaced from the hook by lengths of said line to provide the appearance of natural fish eggs floating on or suspended in water.

* * * * *

UNITED STATES PATENT AND TRADEMARK OFFICE
CERTIFICATE OF CORRECTION

PATENT NO. : 4,773,181

DATED : September 27, 1988

INVENTOR(S) : Charles J. Radden

It is certified that error appears in the above-identified patent and that said Letters Patent is hereby corrected as shown below:

Column 13, claim 11, line 9:

After "egg" insert --assembly--.

Column 13, claim 11, line 15:

"hooks" should be --hook--.

Signed and Sealed this

Eleventh Day of April, 1989

Attest:

*Attesting Officer*

DONALD J. QUIGG

*Commissioner of Patents and Trademarks*